United States Patent Office 3,338,516
Patented Aug. 29, 1967

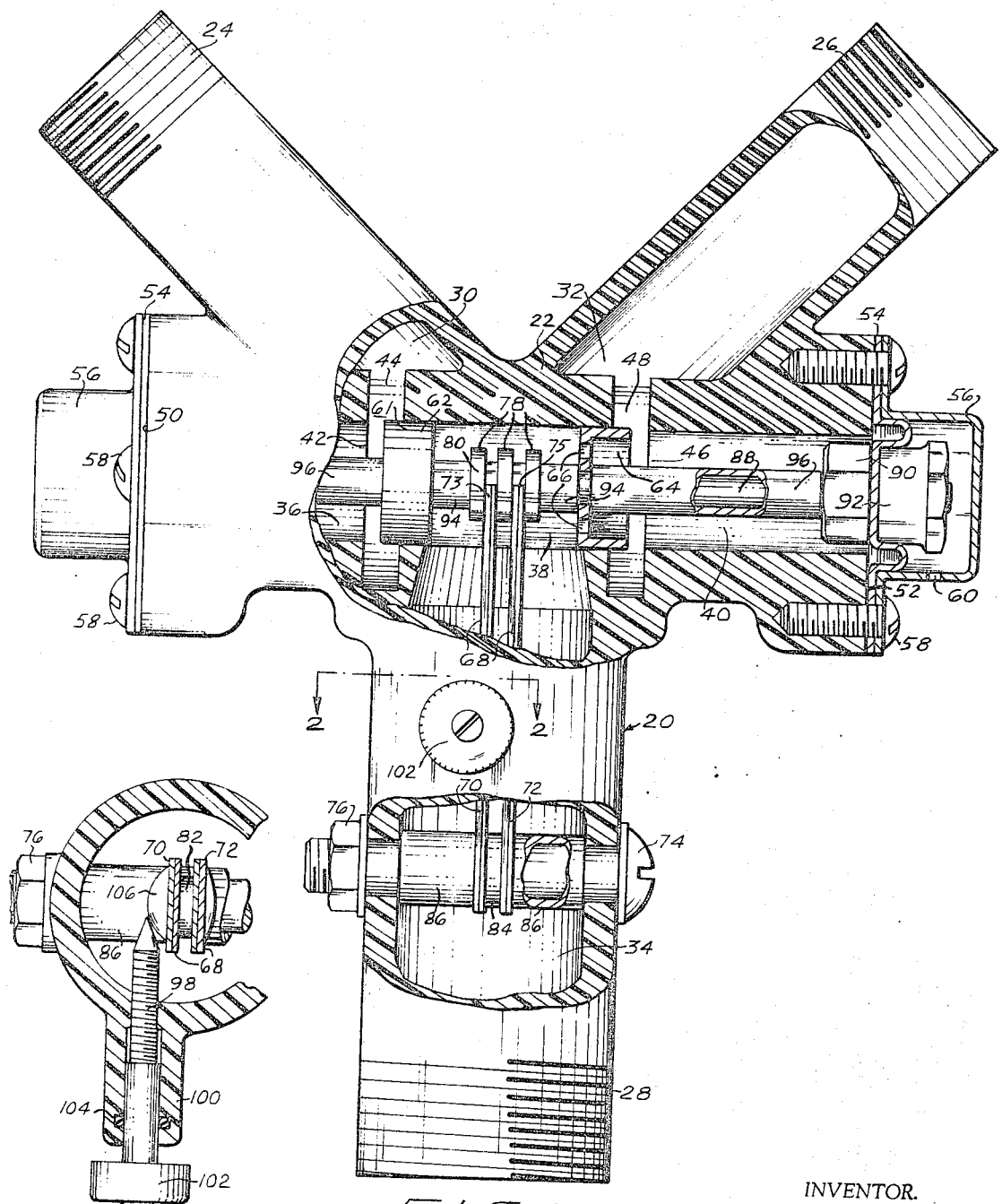

3,338,516
THERMOSTATICALLY CONTROLLED VALVE
Edward L. Parr, El Cajon, Calif., assignor to
Wendell L. Thompson, Burbank, Calif.
Filed Sept. 13, 1965, Ser. No. 486,615
6 Claims. (Cl. 236—12)

ABSTRACT OF THE DISCLOSURE

A mixing valve for two fluids utilizing a spool type valve including two pistons. A rod extends through the pistons and the opposite ends of the rod are fixed to flexible walls. Sleeves surround the rod and are fixedly interposed between the pistons and between the pistons and the flexible walls. The free end of the bimetallic strip actuates the valves. The strip is biased in one direction and the bias is manually controlled for varying the temperature of the mixed fluid.

---

The present invention relates to a mixing valve for fluids, such as hot and cold waters.

The valve of the present invention includes a main valve body having two fluid inlets, one being connectable with a hot water supply and the other being connectable with a cold water supply. These two inlets are connected with inlet chambers in the valve body. Each of these inlet chambers is provided with a flexible wall. The main valve body is also provided with a mixing chamber. A passage connects one of the inlets with one of the numerous inlet chambers and with the mixing chamber; a similar passage connects the other inlet with the other inlet chamber and with the mixing chamber.

Reciprocating valve mechanism controls the flow of fluid through these passages. The reciprocating valve mechanism is provided with one opening whereby the fluid can pass from the inlet chambers into the mixing chamber. This valve mechanism is fastened as a unit with the flexible walls. A thermostat in the mixing chamber is connected with the valve mechanism for moving the same in response to changes in temperature in the mixing chamber.

In the specific embodiment illustrated, the inlet chambers and a portion of the mixing chamber are aligned and are in the form of cylinders and two valve sections in the form of pistons, control the flow through the passages.

Also, in the preferred embodiment, the valves are fastened to one another and with the flexible walls by a rod and this rod is moved by the thermostat in the mixing chamber.

Other features and the advantages of the present invention will be apparent from the following description, reference being had to the accompanying drawing wherein a preferred embodiment of the invention is illustrated.

In the drawing:

FIG. 1 is a front view of the valve, parts thereof being shown in section; and

FIG. 2 is a fragmentary sectional view taken along line 2—2 of FIG. 1.

Referring more in detail to the drawing, the valve 20 includes a main valve body 22. The valve body 22 includes three threaded stems 24, 26 and 28. The stem 24 is connected with a hot water source of supply and forms an inlet 30; the stem 26 is connected with a cold water source of supply and forms an inlet 32; and the stem 28 is connected, for example, to a shower head and provides a mixing chamber 34.

The valve body 22 is provided with a longitudinally extending bore having three separate sections 36, 38 and 40. The section 38 forms the upper part of the mixing chamber 34. The section 36 provides a hot water inlet chamber and the section 40 provides a cold water inlet chamber. The inlet 30 is connected to the open end 42 of the inlet chamber 36 by a passage 44, and the inlet 32 is connected to the open end 46 of the chamber 40 through a passage 48.

The opposite ends 50 and 52, respectively, of the chambers 36 and 40 are each closed by a flexible wall 54, shown specifically to the right in FIG. 1. These flexible walls 54 are covered by caps 56 and these caps together with the flexible wall are held in place by a plurality of screws 58. Each of the caps is provided with a vent 60. Valve mechanism 61 in the form of two sections shown as pistons 62 and 64, are utilized for controlling the flow of fluid from the passages 44 and 48. The head of each piston is provided with a series of holes 66 for the free passage of fluid from the inlets 44 and 48. These valve sections 62 and 64 are slidably mounted in the bore 38 of the mixing chamber. It will be observed that as the valve sections 62 and 64 are moved, as a unit, to the left, the flow of fluid from inlet passage 44 to the mixing chamber will be decreased and the flow of fluid from the inlet passage 48 to the mixing chamber will be increased. The converse is in effect when the valves, as a unit, move to the right. The valves are moved as a unit by a thermostatic element 68 comprising two bimetallic strips 70 and 72, the lower ends of which are fastened to the valve body 22 by a bolt 74 and nut 76, and the free ends 73 and 75 extend between flanges 78 and a spool 80. This spool is suitably fixed to the valve mechanisms. These bimetallic strips function cumulatively and are joined with one another intermediate the ends thereof by a rivet 82.

The lower ends of the strips 70 and 72 are drilled for receiving the bolt 74 and are spaced from one another by a washer 84 and are located in position through sleeves 86. The washer and sleeves surround the bolt 74, and when the bolt and nut are tightened, the strips are fixed in position.

The valve mechanism i.e. valve sections 62 and 64 are fixed to a rod 88 and the opposite ends of the rod 88 are threaded for receiving nuts 90 and 92 and the flexible walls 54 are clamped between these nuts. The spool 80 is spaced from the valve sections 62 and 64 by like sleeves 94 and the valves 62 and 64 are spaced from the flexible walls 54 by sleeves 96. These sleeves 94 and 96 encircle the rod. Also, it will be seen that by tightening the nuts 90 and 92, the spool 80 and the valves 62 and 64 are held in fixed position with respect to one another and with respect to the flexible walls 54. The flexible walls 54 are of such composition that they offer substantially no resistance to movement of the rod and the valves.

In view of the fact that the thermostatic element 68 is in the direct path of the mixed water, the element is extremely sensitive to any variation in temperature whereby the water flowing out of the stem 28 is maintained substantially constant regardless of whether or not there has been a drawing off of either hot or cold water in other parts of the water system to which the valve is connected.

The temperature can be regulated to that desired by a needle valve 98 which extends through a hollow boss 100 formed integrally with the valve body 22. It is actuated by a knob 102 and is sealed against leakage by an O-ring 104. This rod is arranged to engage a projecting portion 106 of the rivet 82 for biasing the thermostatic element 68 to the right as viewed in the drawing.

Inasmuch as the inlet chambers 36 and 40 are interconnected with one another through the bore 38 and the opening 66 in the valves, and inasmuch as the walls 54 of the chambers 36 and 40 are flexible, the pressure within either of the chambers 36 and 40 is constant although a valve 62 or 64 may close passage 44 or 48, respectively. The flexible walls 54 being fixed to one another through the rod 88, will follow the movement of the valves.

The major portions of the valve, namely, the main valve body 22, spool 80, valve sections 62 and 64, rod 88 and the intermediate sleeves, the bolt 74 and nut 76 together with the washer 84 and the sleeves 86, all may be formed of suitable plastic, such as nylon. Thus the valve is extremely simple in construction, readily assembled and inexpensive, yet it is highly sensitive to slight changes in temperature of the water flowing in the mixing chamber 34.

While the form of embodiment herein shown and described constitutes preferred form, it is to be understood that other forms may be adapted falling within the scope of the claims that follow.

I claim:
1. A mixing valve for fluids, such as hot and cold waters, said valve comprising:
 (A) a main valve body having:
  (1) two fluid inlets;
  (2) an inlet chamber having one end connected with one of the inlets, said chamber having a flexible end wall opposite the first mentioned end;
  (3) a second inlet chamber having one end connected with the other inlet, said second mentioned inlet chamber having a flexible end wall opposite the first mentioned end thereof;
  (4) a mixing chamber;
  (5) a passage connecting one of the inlets with one of the inlet chambers and with the mixing chamber;
  (6) a passage connecting the other inlet with the other inlet chamber and with the mixing chamber;
 (B) a reciprocating valve mechanism, said valve mechanism including:
  (1) section having an opening therethrough leading fluid through one of said passages, said valve section having: an opening therethrough leading to the mixing chamber;
  (2) a second valve section for controlling the flow of fluid through the other of said passages, said second mentioned valve having an opening therethrough leading to the mixing chamber;
  (3) means for fastening the valve mechanism with the flexible walls;
 (C) means responsive to the temperature in the mixing chamber for actuating said reciprocating valve mechanism, said last mentioned means including:
  (1) a bimetallic strip having a free end engageable with the reciprocating valve mechanism for moving the latter, said strip extending into the mixing chamber;
  (2) means for fixing the opposite end of the strip in the mixing chamber;
 (D) and adjustable means for biasing the bimetallic strip in one direction, said adjustable means engaging the bimetallic strip intermediate the ends thereof.

2. A mixing valve for fluids, such as hot and cold waters, said valve comprising:
 (A) a main valve body having:
  (1) two fluid inlets;
  (2) an inlet chamber having one end connected with one of the inlets, said chamber having a flexible end wall opposite the first mentioned end;
  (3) a second inlet chamber having one end connected with the other inlet, said second mentioned inlet chamber having a flexible end wall opposite the first mentioned end thereof;
  (4) a mixing chamber;
  (5) a passage connecting one of the inlets with one of the inlet chambers and with the mixing chamber;
  (6) a passage connecting the other inlet with the other inlet chamber and with the mixing chamber;
 (B) a valve unit including:
  (1) a valve section for controlling the flow of fluid through one of the passages to the mixing chamber;
  (2) a second valve section for controlling the flow of fluid through the other of said passages to the mixing chamber;
 (C) means for fastening the valve with the flexible walls including:
  (1) a rod for fastening the flexible walls with one another, said rod extending through the valve sections;
  (2) a sleeve surrounding the rod and fixedly interposed between one of the valve sections and one of the flexible walls;
  (3) a second sleeve surrounding the rod and fixedly interposed between the other valve section and the other flexible wall;
 (D) and means responsive to the temperature in the mixing chamber for actuating the valve sections as a unit.

3. A mixing valve as defined in claim 2, characterized in that the valve sections are axially aligned, and further characterized in that the valve unit includes:
 (3) sleeve means fixedly interposed between confronting surfaces of the valve sections;
and further characterized in that the means (D), which is responsive to the temperature in the mixing chamber, actuates the valve sections through the sleeve means (C) (3).

4. A mixing valve as defined in claim 2, characterized in that the means (D), which is responsive to the temperature in the mixing chamber, includes:
 (1) a bimetallic strip having a free end engageable with the valve unit for moving the latter, said strip extending into the mixing chamber;
 (2) means for fixing the opposite ends of the strip in the mixing chamber;
 (E) and adjustable means for biasing the bimetallic strip in one direction, said adjustable means engaging the bimetallic strip intermediate the ends thereof.

5. A mixing valve as defined in claim 2, characterized in that the inlet chambers and a portion of the mixing chamber are aligned and are in the form of cylinders, and the reciprocatable valve sections are in the form of pistons.

6. A mixing valve as defined in claim 4, characterized in that the free end of the bimetallic strip actuates the valve unit through the sleeve means which is interposed between the valve sections.

References Cited
UNITED STATES PATENTS

| | | | |
|---|---|---|---|
| 2,145,114 | 1/1939 | Gibbs et al. | |
| 2,288,599 | 7/1942 | Ramsaur | 236—12 X |
| 2,413,002 | 12/1946 | Schurtz. | |
| 2,675,099 | 4/1954 | Troy | 236—12 X |
| 2,997,240 | 8/1961 | Kreuttner | 236—13 |
| 3,028,094 | 4/1962 | Burhop | 236—12 |

ROBERT A. O'LEARY, Primary Examiner.
W. E. WAYNER, Assistant Examiner.